United States Patent
Nakade et al.

(10) Patent No.: US 6,791,042 B2
(45) Date of Patent: Sep. 14, 2004

(54) AUTOMOTIVE LEVER SWITCH

(75) Inventors: Yoshiyuki Nakade, Fukui (JP); Takeo Nakamura, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/348,297

(22) Filed: Jan. 21, 2003

(65) Prior Publication Data

US 2003/0155223 A1 Aug. 21, 2003

(30) Foreign Application Priority Data

Jan. 21, 2002 (JP) ........................................ 2002-011355

(51) Int. Cl.[7] .............................................. H01H 35/00
(52) U.S. Cl. ...................................... 200/61; 200/61.54
(58) Field of Search ................................ 200/61, 61.27, 200/61.3–61.33, 61.54, 17 R, 332, 335

(56) References Cited

U.S. PATENT DOCUMENTS

| | | | | |
|---|---|---|---|---|
| 3,859,489 A | * | 1/1975 | Tomlinson | 200/567 |
| 4,218,595 A | * | 8/1980 | Honjo | 200/61.54 |
| 4,219,706 A | * | 8/1980 | Koch et al. | 200/4 |
| 4,942,273 A | * | 7/1990 | Furuhashi et al. | 200/61.54 |
| 5,670,765 A | * | 9/1997 | Yokoyama et al. | 200/61.54 |
| 5,780,794 A | * | 7/1998 | Uchiyama et al. | 200/61.54 |
| 5,804,784 A | * | 9/1998 | Uchiyama et al. | 200/61.54 |
| 5,895,899 A | * | 4/1999 | Sano | 200/61.54 |
| 6,011,225 A | * | 1/2000 | Yokoyama | 200/61.27 |
| 6,150,620 A | * | 11/2000 | Luley et al. | 200/61.27 |
| 6,548,770 B1 | * | 4/2003 | Stewart et al. | 200/61.27 |

* cited by examiner

Primary Examiner—Elvin Enad
Assistant Examiner—Lisa Klaus
(74) Attorney, Agent, or Firm—RatnerPrestia

(57) ABSTRACT

An automotive lever switch disclosed in this invention comprises:
(a) an approximately cylinder-like lever switch body having opening formed along side-wall from tip to foot;
(b) a cover to cover the opening;
(c) a switch disposed at tip of lever switch body; and
(d) a lead-wire having first end connected to the switch and second end protruding from foot of lever switch body, wherein, first slope face provided in coupling section at one end of opening of lever switch body and second slope face provided in fitting section at foot of cover are fitted together to prevent the cover from coming off the lever switch body.

8 Claims, 8 Drawing Sheets

AUTOMOTIVE LEVER SWITCH

FIELD OF THE INVENTION

The present invention relates to an automotive lever switch for use in switching selector for headlight or windshield wiper speed.

BACKGROUND ART

Nowadays, along with advance in multi-functional car technologies, many kinds of automotive lever switch with diversified functions fitted around steering-wheel are developed using a plurality of components for turn-signal-switch-unit to operate flashing indicator or wiper-switch-unit to select wiping speed.

A conventional automotive lever switch is described with reference to FIGS. 7 and 8. FIG. 7 shows a cross-sectional view of a conventional automotive lever switch. In FIG. 7, approximately cylinder-like automotive lever switch body 1 (hereafter refer to lever body 1) formed of insulating resin has opening 1A formed along side-wall from tip to foot longitudinally.

A conventional automotive lever switch comprises; (a) rotatable operation switch 2, and (b) cap-shaped operation knob 3 composed of an insulating resin. Shaft holder 1B of lever body 1 holds approximately cylinder-like intermediate shaft portion 2A of switch 2, and an end of shaft portion 2A is fixed by fixing ring 2B. Operation knob 3 for switch 2 mounted at tip of lever body 1 is fixed rotatably on periphery of switch 2 at tip of lever body 1.

Additionally, first end of lead-wire 4, housed in lever body 1, is connected to switch 2, and second end is connected to connector 4A which protrudes from foot of lever body 1.

Moreover, both ends of cover 5, composed of insulating resin, are fixed by screws 20A, 20B on lever body 1 to cover opening 1A formed along side-wall of lever body 1 to form automotive lever switch 6.

Next, assembling method of automotive lever switch 6 of above configuration is described.

First, shaft portion 2A of switch 2 to which lead-wire 4 has been connected is put into shaft holder 1B from tip of lever body 1. Then, shaft portion 2A is fixed on shaft holder 1B using fixing ring 2B inserted at end of shaft portion 2A from opening 1A.

Then, operation knob 3 for switch 2 mounted at tip of lever body 1 is fixed rotatably on periphery of switch 2, and lead-wire 4 is housed in lever body 1 from opening 1A to draw out connector 4A from foot of lever body 1.

Next, both ends of cover 5 are fixed on lever body 1 by screws 20A, 20B to cover opening 1A formed along side-wall of lever body 1 resulting in an assembly of automotive lever switch 6.

Automotive lever switch 6 assembled as above has a configuration that a foot of an automotive lever switch 6 is mounted in a predetermined place of switch unit body 7, and connector 4A of lead-wire 4 is connected to an electronic circuit (not shown) in switch unit body 7 to form switch unit 8 as shown in a side view of switch unit 8 in FIG. 8.

The configuration sends a prescribed signal to switch unit body 7 through lead-wire 4 to carry out, for example, selection of head light, when operation knob 3 at tip of automotive lever switch 6 is rotated to induce switching operation of internal switch 2.

However, aforementioned conventional automotive lever switch 6 has a drawback to need a long time for assembling, as opening 1A provided to mount switch 2 or to house lead-wire 4 must be covered to lever body 1 with cover 5 screwed by screws 20A, 20B in two places.

SUMMARY OF THE INVENTION

An automotive lever switch disclosed in this invention comprises: (a) an approximately cylinder-like lever switch body having opening formed along side-wall from tip to foot; (b) a cover to cover the opening; (c) a switch disposed at tip of lever switch body; and (d) a lead-wire having first end connected to the switch and second end protruding from foot of lever switch body, wherein, first slope face provided in coupling section at one end of lever switch body and second slope face provided in fitting section of cover are fitted together to prevent the cover from coming off the lever switch body.

DETAILED DESCRIPTION OF THE INVENTION

The preferred embodiments of this invention are described with reference to FIGS. 1 to 6. The similar elements described in conventional art have the same reference marks, and the detailed description thereof is omitted.

(Preferred Embodiment 1)

Figure 1:
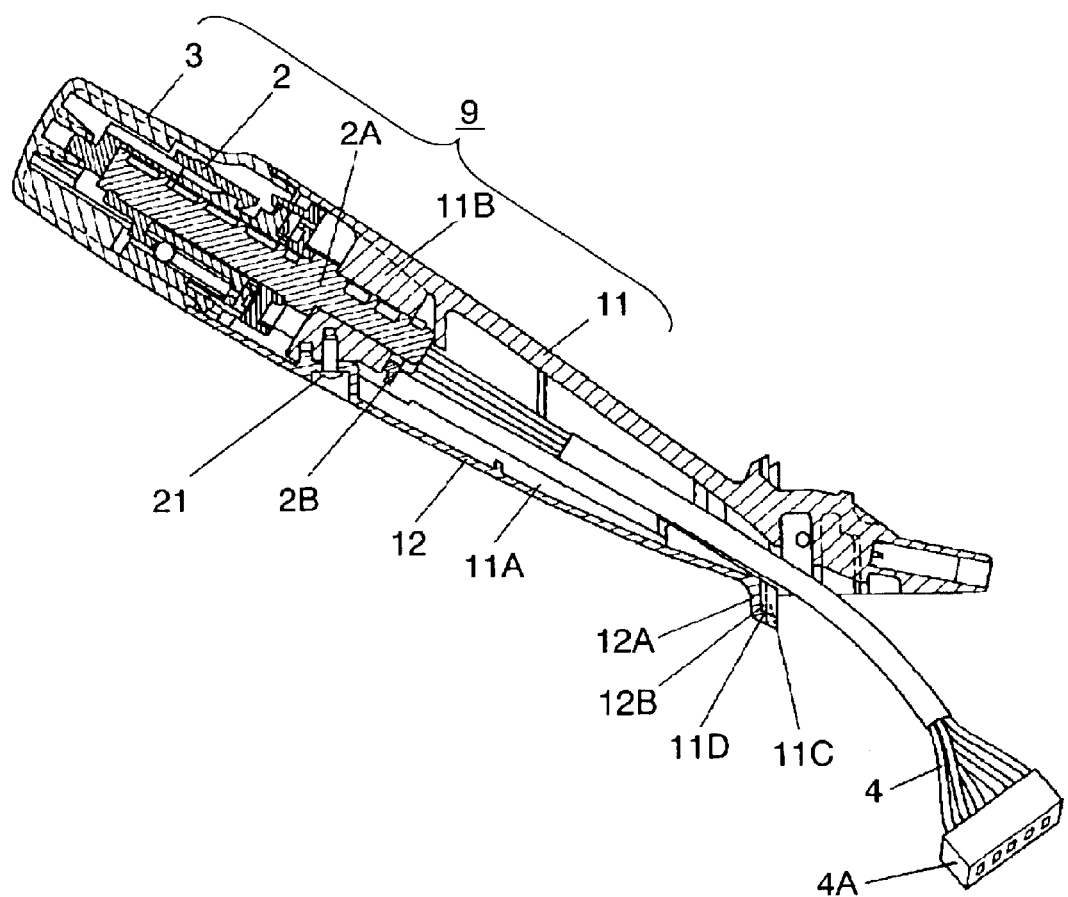
FIG. 1 illustrates a cross-sectional view showing an automotive lever switch used in preferred embodiment 1 of the present invention.
Figure 2:
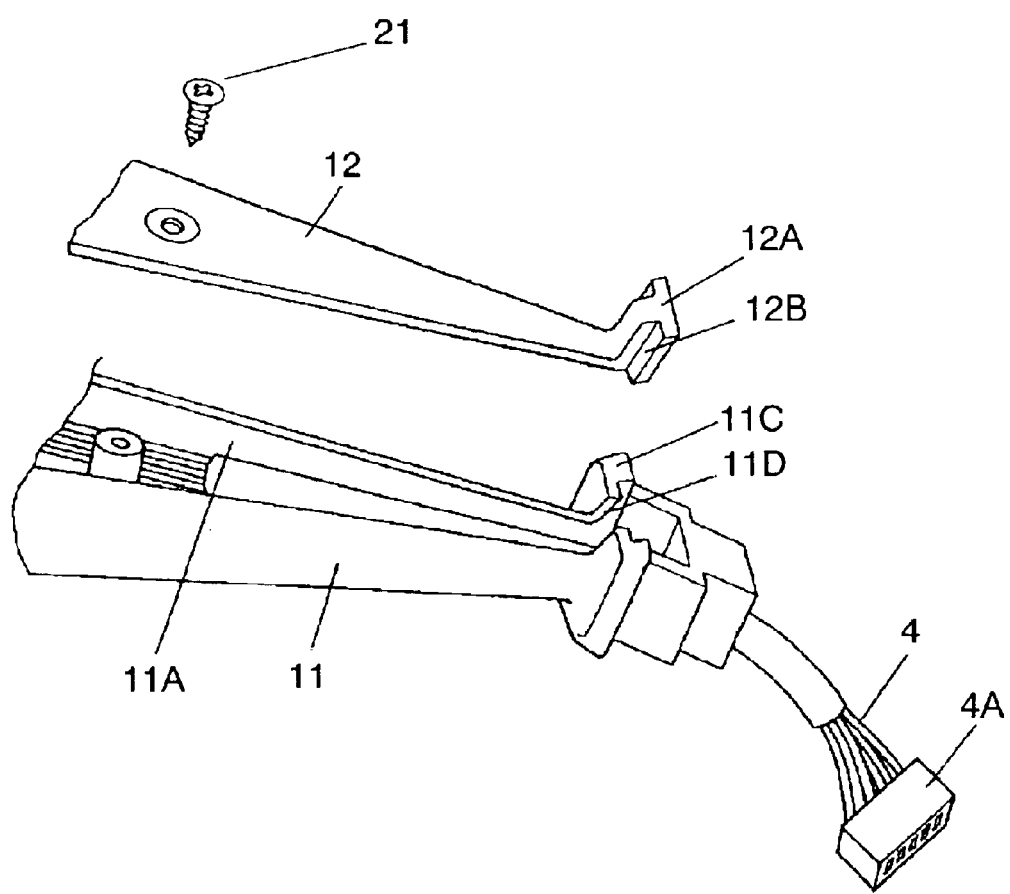
FIG. 2 illustrates a partial perspective view showing a side-wall of preferred embodiment 1 of the present invention.

FIG. 1 shows a cross-sectional view of an automotive lever switch used in preferred embodiment 1 of this invention, and FIG. 2 shows a partial perspective side view of preferred embodiment 1.

In FIG. 2, approximately cylinder-like lever body 11 composed of insulating resin is provided with opening 11A formed along side-wall from tip to foot longitudinally. A foot of lever body has coupling section 11C having first slope face 11D forming a slope protruding from inside to outside of the body.

An automotive lever switch has rotatable operation switch 2 and cap-shaped operation knob 3 composed of insulating resin. Approximately cylinder-like shaft portion 2A, intermediate of switch 2, is put into shaft holder 11B. Then, shaft portion 2A is fixed on shaft holder 11B using fixing ring 2B inserted at end of shaft portion 2A.

Operation knob 3 is fixed rotatably on external wall of switch 2 which is mounted on tip of lever body 11. Lead-wire 4 is housed in lever body 11 to draw out connector 4A from foot of lever body 11.

Additionally, cover 12 composed of insulating resin covers opening 11A provided in side-wall of lever body 11. At foot of cover 12, approximately T-shaped fitting portion 12A is provided having second slope face 12B protruding perpendicularly to longitudinal direction and sloping down to end direction, corresponding to first slope face 11D of lever body 11.

Second slope face 12B of cover 12 and first slope face 11D are fitted together to prevent cover 12 from coming off lever body 11. Then, other end of cover 12 is fixed on lever body 11 by screw 21 to form an automotive lever switch.

Next, an assembling method of an automotive lever switch 9 of above configuration is described.

Firstly, shaft portion 2A intermediate of switch 2 connected with lead-wire 4 is put into shaft holder 11B from tip of lever body 11. Then, shaft portion 2A is fixed on shaft holder 11B using fixing ring 2B inserted at the end of shaft portion 2A from opening 11A as shown in FIG. 1.

Operation knob 3 is fixed rotatably on external wall of switch 2 mounted on tip of lever body 11. Lead-wire 4 is housed in opening 11A formed along side-wall of lever body 11 to draw out connector 4A from foot of lever body 11.

Next, sliding into coupling portion 11C of lever body 11, foot of cover 12 is inserted so that second slope face 12B provided in fitting section 12A of cover 12 fits first slope face 11D provided in coupling section 11C of lever body 11. Automotive lever switch 9 is thus assembled that foot of cover 12 is fitted to lever body 11, while tip side is fixed using screw 21.

Figure 3:
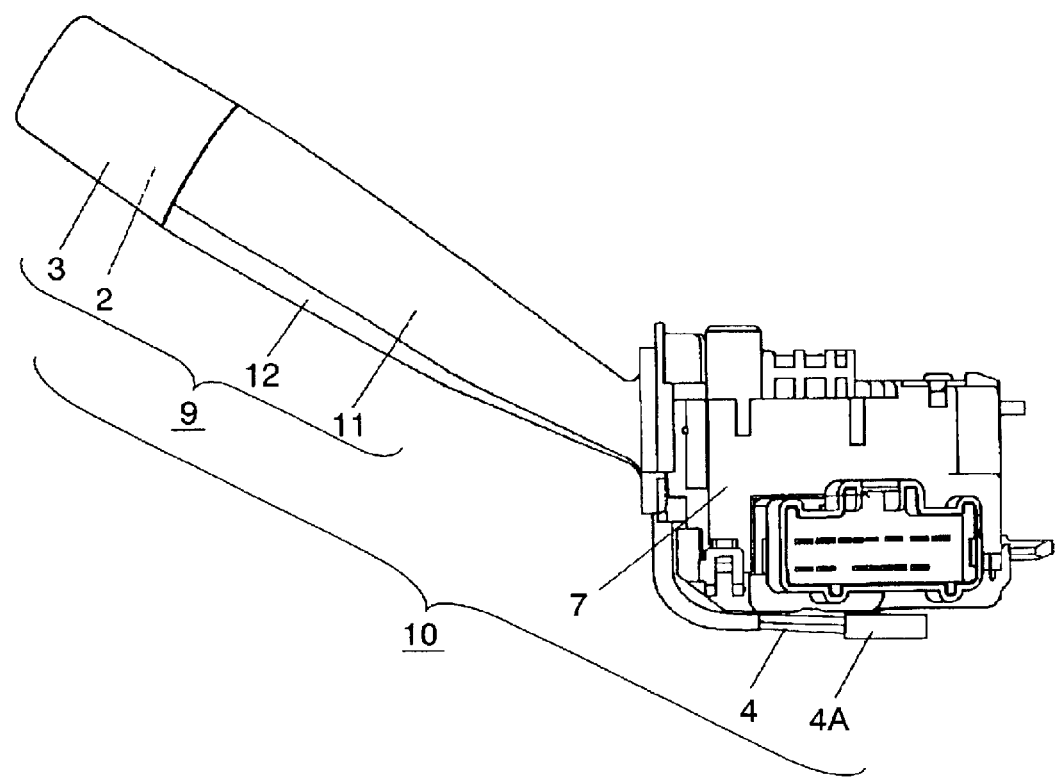
FIG. 3 illustrates a side view showing a switch unit used in preferred embodiment 1 of the present invention.
Figure 4:
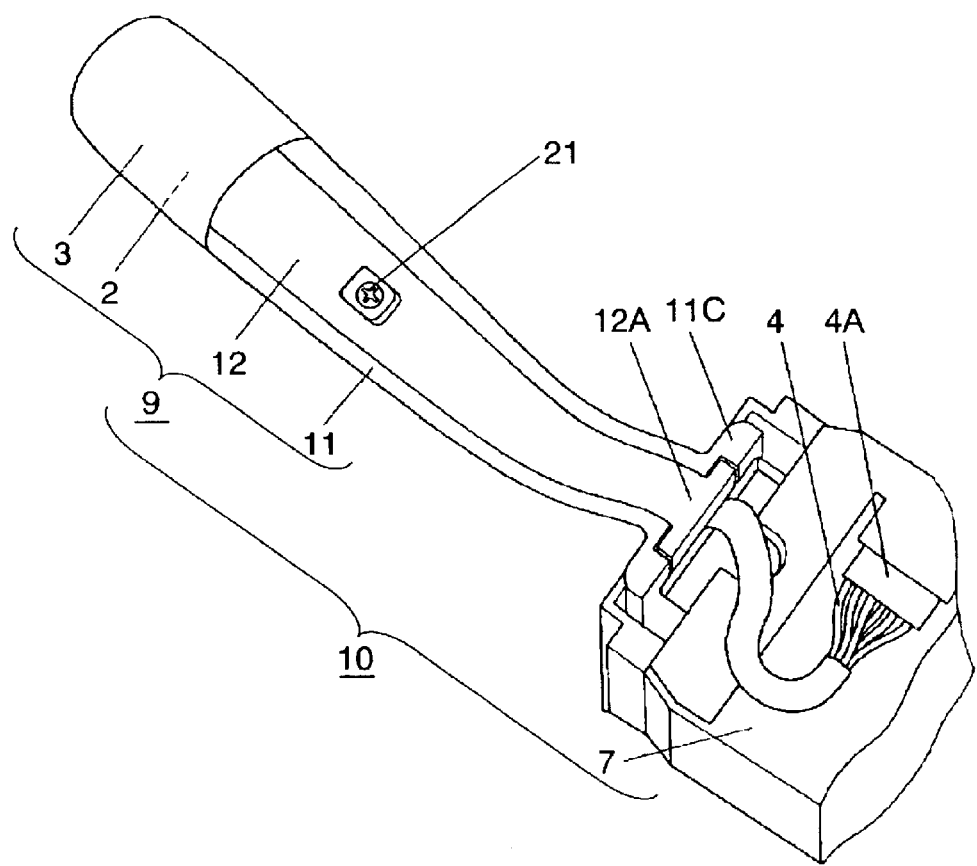
FIG. 4 illustrates a perspective side view of preferred embodiment 1 of the present invention.

In addition, as shown in side view of switch unit 10 in FIG. 3, or in side perspective view in FIG. 4, foot of automotive lever switch 9 assembled as above is mounted at a predetermined position of switch unit body 7. Connector 4A of lead-wire 4 is connected to an electric circuit (not shown) in switch unit body 7 to form switch unit 10.

The configuration sends a prescribed signal to switch unit body 7 through lead-wire 4 to carry out, for example, selection of head light, when operation knob 3 at tip of an automotive lever switch 6 is rotated to induce switching operation of internal switch 2.

As mentioned in above preferred embodiment 1, the configuration can prevent foot of cover 12 from coming off lever body 11, as first slope face 11D provided in coupling section 11C at foot of opening 11A of lever switch body 11 and second slope face 12B provided in fitting section 12A at foot of cover 12 are fitted together.

The configuration can provide an efficient assembling method and a reduced production cost for automotive lever switches, as cover 12 needs screwing screw 21 for fixing only at tip side.

(Preferred Embodiment 2)

Figure 5:
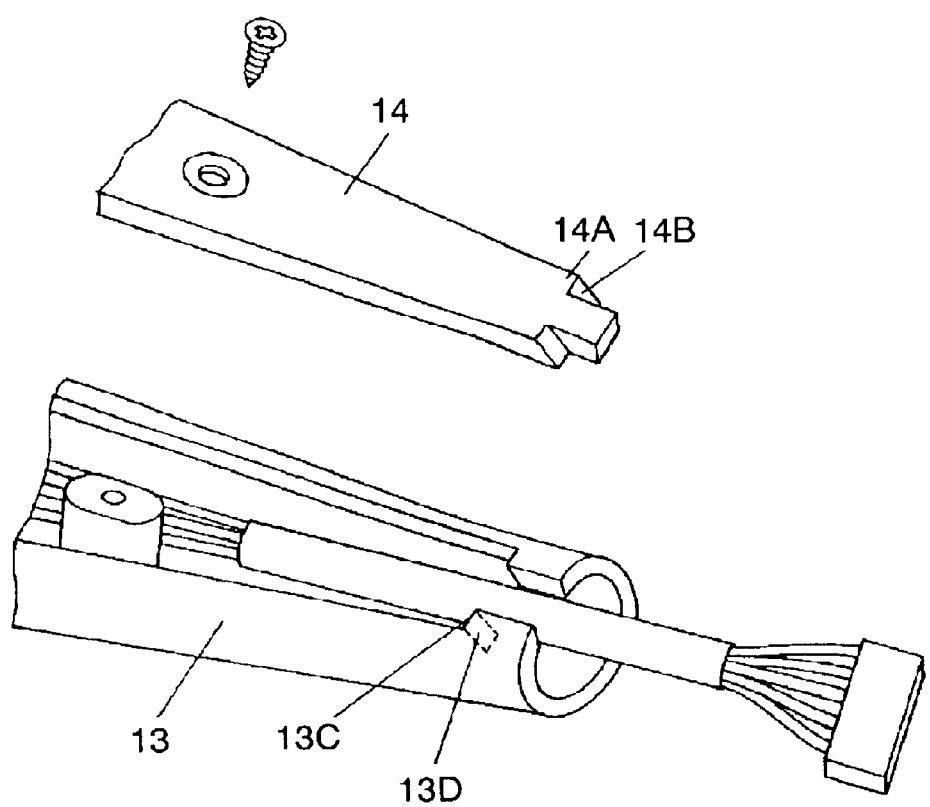
FIG. 5 illustrates a partial perspective view of preferred embodiment 2 of the present invention.

Now, preferred embodiment 2 is described with reference to FIG. 5.

Configuration of preferred embodiment 1 is so described that coupling portion 11C and fitting portion 12A, protruding to external wall, are provided at foot of lever body 11 and cover 12.

As shown in partial perspective view in FIG. 2, preferred embodiment 2 can prevent cover 14 from coming off lever body with the configuration of:

(a) rectangular shaped notch provided at foot of lever body 13;
(b) coupling portion 13C provided with first slope face 13D having slope from external to internal longitudinaly on edge of notch; and
(c) fitting portion 14A, at foot of cover 14, provided with second slope face 14B to fit against slope face 13D.

The identical effect can be expected in preferred embodiment 2 as well as preferred embodiment 1.

(Preferred Embodiment 3)

Figure 6:
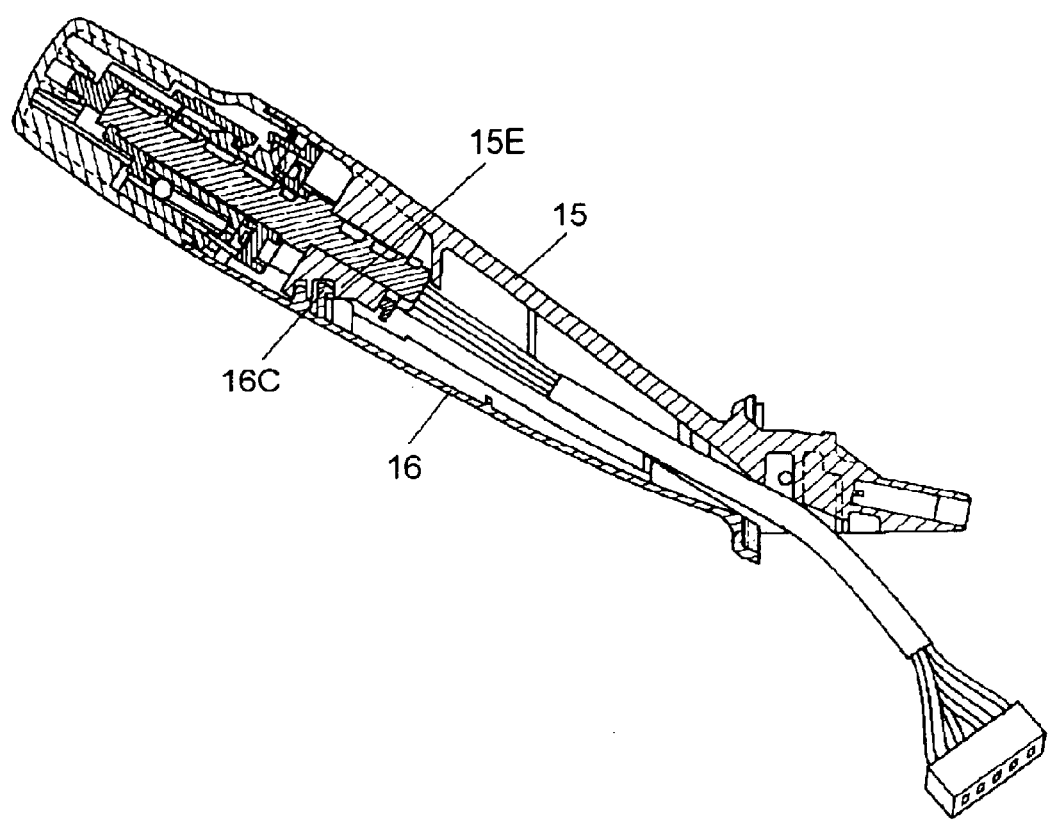
FIG. 6 illustrates a cross-sectional view of preferred embodiment 3 of the present invention.
Figure 7:
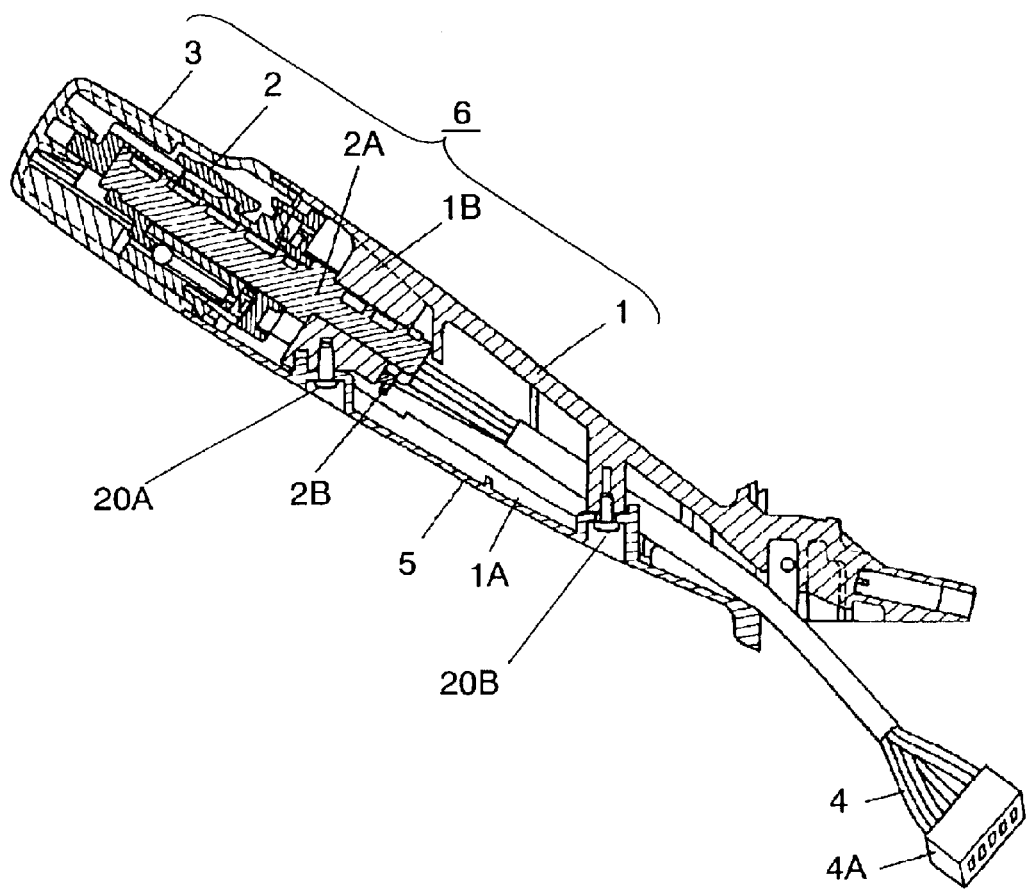
FIG. 7 illustrates a cross-sectional view showing a conventional automotive lever switch.
Figure 8:
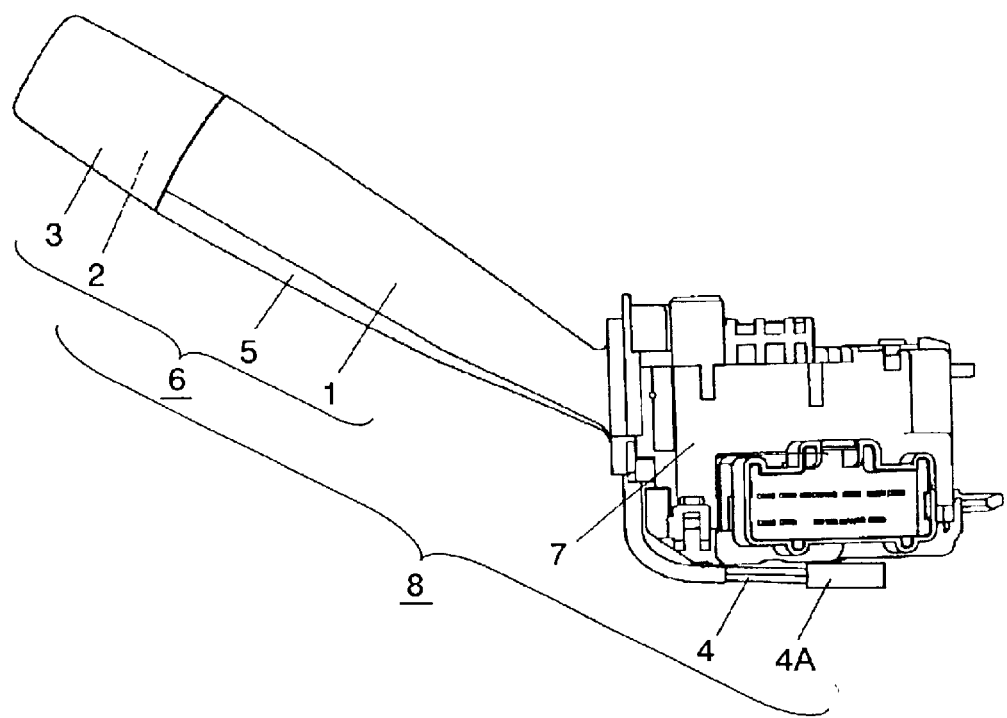
FIG. 8 illustrates a side view showing a conventional switch unit.

Preferred embodiment 3 is described with reference to FIG. 6. As shown in a cross-sectional view in FIG. 6, preferred embodiment 3 has a configuration of:

(a) hook portion 16C provided with a convex at other end of cover 16; and
(b) hook holder 15E provided on lever body 15 with a concave to fit with a convex at other end of cover 16 due to hinge effect, wherein both ends of cover 16 and lever body 15 are fixed together by hook portion 16C and hook holder 15E.

Additionally, a contrary configuration can also be possible comprising:

(c) hook portion 16C provided with a concave at other end of cover 16; and
(d) hook holder 15E provided on lever switch body 15 with a convex to fit with a convex at other end of cover 16 due to hinge effect, wherein both ends of cover 16 and lever body 15 are fixed together by hook portion 16C and hook holder 15E.

The configuration can assemble lever switch easily as cover 16 can be fixed on lever body 15 through one-touch operation without using tools and screws such as screw to be used in other end of cover 16.

As mentioned above, the configuration disclosed in this invention can reduce number of parts, can assemble efficiently to reduce production cost of automotive lever switches.

What is claimed is:

1. An automotive lever switch comprising:
   (a) an approximately cylinder-like lever switch body having opening formed along side-wall from tip to foot;
   (b) a cover to cover said opening;
   (c) a switch disposed at tip of said lever switch body; and
   (d) a lead-wire having first end connected to said switch and second end protruding from foot of said lever switch body,
   wherein, a first slope face provided at a coupling section at one end of said opening of said lever switch body and a second slope face provided at a fitting section of said cover are adapted to mate together to prevent said cover from coming off said lever switch body.

2. The automotive lever switch of claim 1, further comprising:
   a concave or a convex at an other end of said opening of said lever switch body, and a convex or a concave at an other end of said cover;
   wherein said convex is at the other end of said cover when the other end of said opening of said lever switch body has said concave; and
   said concave is at the other end of said cover when the other end of said opening of said lever switch body has said convex,
   wherein, said concave and said convex are fitted together.

3. The automotive lever switch of claim 2,
   wherein said cover at said fitting section has a hook portion opposite said foot of said cover, and is adapted to mate with a hook holder opposite said foot of said lever switch body.

4. The automotive lever switch of claim 1,
   wherein said cover at said fitting section has a hook portion opposite said foot of said cover, and is adapted to mate with a hook holder opposite said foot of said lever switch body.

5. An automotive lever switch comprising:

(a) an approximately cylinder-like lever switch body having opening formed along side-wall from tip to foot;

(b) a cover to cover said opening;

(c) a switch disposed at tip of said lever switch body; and (d) a lead-wire having first end connected to said switch and second end protruding from foot of said lever switch body, wherein a first slope face is provided at a coupling section at one end of said opening of said lever switch body and a second slope face provided at a fitting section of said cover are adapted to mate together, wherein said first slope face is protruded outwardly from a longitudinal direction of said lever body so as to make an acute angle with the longitudinal direction including the opening, and wherein said second slope face is protruded outwardly from a longitudinal direction of said cover along said first slope face, and said first slope face urges an upper surface of said second slope face to prevent said cover from coming off said lever switch body.

6. The automotive lever switch of claim 5, wherein said cover at said fitting section has a hook portion opposite said foot of said cover, and is adapted to mate with a hook holder opposite said foot of said lever switch body.

7. An automotive lever switch comprising:

(a) an approximately cylinder-like lever switch body having opening formed along side-wall from tip to foot;

(b) a cover to cover said opening;

(c) a switch disposed at tip of said lever switch body; and (d) a lead-wire having first end connected to said switch and second end protruding from foot of said lever switch body, wherein a first slope face is provided at a coupling section at one end of said opening of said lever switch body and a second slope face provided at a fitting section of said cover along said first slope face are adapted to mate together, wherein said first slope face is protruded outwardly from a longitudinal direction of said lever switch body so as to make an acute angle with the longitudinal direction including the opening, wherein said first slope face urges an upper surface of said second slope face to prevent said cover from coming off said lever switch body, and wherein said cover at said fitting section has a protrusion extending from said foot of said cover in a longitudinal direction of said cover, and is adapted to mate with a notch at said foot of said lever switch body which extends in said longitudinal direction of said lever switch body.

8. The automotive lever switch of claim 7, wherein said cover at said fitting section has a hook portion opposite said foot of said cover, and is adapted to mate with a hook holder opposite said foot of said lever switch body.

* * * * *